(12) United States Patent
Pae et al.

(10) Patent No.: US 11,848,588 B2
(45) Date of Patent: Dec. 19, 2023

(54) MOTOR INTEGRATED WITH CONTROL UNIT AND WATER PUMP HAVING THE SAME

(71) Applicant: COAVIS, Sejong-si (KR)

(72) Inventors: Wan Sung Pae, Sejong-si (KR); Dong Heon Mo, Sejong-si (KR); Joon Seup Kim, Daejeon (KR)

(73) Assignee: COAVIS, Sejong-si (KR)

( * ) Notice: Subject to any disclaimer, the term of this patent is extended or adjusted under 35 U.S.C. 154(b) by 580 days.

(21) Appl. No.: 17/021,452

(22) Filed: Sep. 15, 2020

(65) Prior Publication Data

US 2021/0083558 A1 Mar. 18, 2021

(30) Foreign Application Priority Data

Sep. 16, 2019 (KR) .................. 10-2019-0113653

(51) Int. Cl.
*H02K 11/30* (2016.01)
*F04D 13/06* (2006.01)
*H02K 9/22* (2006.01)
*H02K 3/52* (2006.01)
*F04D 29/58* (2006.01)

(52) U.S. Cl.
CPC ......... *H02K 11/30* (2016.01); *F04D 13/0686* (2013.01); *F04D 29/5813* (2013.01); *H02K 3/522* (2013.01); *H02K 9/22* (2013.01); *H02K 2211/03* (2013.01)

(58) Field of Classification Search
CPC ............. F04D 13/0686; F04D 29/5813; F04D 29/5806; F04D 13/0606; F04D 29/586; F04D 29/5893; F04D 29/588; H02K 9/227; H02K 9/22; H02K 11/30; H02K 11/33; H02K 2211/03; H02K 3/52; H02K 3/521; H02K 3/522; H02K 5/00; H02K 5/04; H02K 5/18; H05K 1/0201–1/0212; H05K 7/2039; H05K 7/209; H05K 7/20445; H05K 7/20854
See application file for complete search history.

(56) References Cited

U.S. PATENT DOCUMENTS

| 10,267,316 B1* | 4/2019 | Sandstrom .......... F04D 13/0606 |
| 2004/0062664 A1* | 4/2004 | Weigold ................ F04D 13/064 417/357 |
| 2006/0057002 A1* | 3/2006 | Nakanishi ............. F04D 13/064 417/423.1 |

(Continued)

FOREIGN PATENT DOCUMENTS

| JP | 2009100628 A | 5/2009 |
| KR | 20120140412 A | 12/2012 |
| KR | 2016082735 A | 5/2016 |

OTHER PUBLICATIONS

Korean Office Action for Application No. 10-2019-0113653, dated Nov. 18, 2020.

*Primary Examiner* — Bryan M Lettman
(74) *Attorney, Agent, or Firm* — NIXON PEABODY LLP (57) ABSTRACT

A motor integrated with a control unit having an efficiency in cooling by allowing the heat generated by the motor to be radiated away from the motor. Heat generated from the control unit is separately radiated away from the control unit. The motor integrated with the control unit can be utilized in water pumps.

10 Claims, 7 Drawing Sheets

(56) References Cited

U.S. PATENT DOCUMENTS

| | | | | |
|---|---|---|---|---|
| 2012/0263581 A1* | 10/2012 | Li | ............... | F04D 29/588 |
| | | | | 415/177 |
| 2013/0108490 A1* | 5/2013 | Lee | ............... | F04D 13/0606 |
| | | | | 417/423.14 |
| 2013/0213325 A1* | 8/2013 | Kim | ............... | F01P 5/12 |
| | | | | 417/423.1 |
| 2013/0302142 A1* | 11/2013 | Chiu | ............... | F04D 29/061 |
| | | | | 415/115 |
| 2014/0010684 A1* | 1/2014 | Joschko | ............... | F04B 17/03 |
| | | | | 417/410.1 |
| 2016/0006324 A1* | 1/2016 | Akutsu | ............... | H02K 7/003 |
| | | | | 310/67 R |
| 2016/0218596 A1* | 7/2016 | Hayashi | ............... | H02K 9/223 |
| 2017/0324298 A1* | 11/2017 | Brösamle | ............... | F04D 29/026 |
| 2018/0131248 A1* | 5/2018 | Becker | ............... | H02K 7/116 |
| 2018/0254685 A1* | 9/2018 | Seki | ............... | F04C 13/001 |
| 2018/0372118 A1* | 12/2018 | Bedin | ............... | H02K 5/225 |
| 2019/0368508 A1* | 12/2019 | Lee | ............... | F04D 13/0606 |

\* cited by examiner

MOTOR INTEGRATED WITH CONTROL UNIT AND WATER PUMP HAVING THE SAME

CROSS-REFERENCE TO RELATED APPLICATIONS

This application claims priority under 35 U.S.C. § 119 to Korean Patent Application No. 10-2019-0113653, filed on Sep. 16, 2019, in the Korean Intellectual Property Office, the disclosure of which is incorporated herein by reference in its entirety.

TECHNICAL FIELD

The following disclosure relates to a motor integrated with a control unit in which a brushless direct current (BLDC) motor and an inverter are formed integrally with each other, and a water pump having the same.

BACKGROUND

A brushless direct current (BLDC) motor refers to a direct current (DC) motor in which an electronic commutator is installed instead of a brush and a commutator, and may have a long life and relatively high efficiency by having none of friction and wear which are disadvantages of a conventional DC motor.

In general, such a BLDC motor may be an inverter-integrated BLDC motor having a compact configuration in which a motor unit and an inverter unit are formed integrally with each other. Here, the motor unit may include a stator having coils wound thereon and fixed in a housing and a rotor disposed to be close to the stator and rotatably coupled to the housing by having a permanent magnet mounted thereon. In addition, the inverter unit may include a printed circuit board (PCB) on which various electronic devices including switching devices for controlling the motor unit are mounted, and the switching devices mounted on the PCB may be configured to be electrically connected to the coils wound on the stator of the motor unit.

Here, when the inverter-integrated BLDC motor is operated, heat may be generated from the coils wound on the stator of the motor unit and a bearing or bushing supporting a rotating shaft of the rotor, and a lot of heat may be generated from the electronic devices such as the switching devices mounted on the PCB of the inverter unit.

However, such a conventional inverter-integrated BLDC motor has a structure in which the heat generated from the inverter unit including the PCB is transferred to the motor unit to be radiated to the outside through the housing of the motor unit, and may thus be difficult to be efficiently cooled.

RELATED ART DOCUMENT

Patent Document

JP 2016-082735 A (May 16, 2016)

SUMMARY

An embodiment of the present disclosure is directed to providing a motor integrated with a control unit, in which even though a motor unit and the control unit are formed integrally with each other, the motor unit and the control unit are efficiently cooled by allowing heat generated from the motor unit to be radiated from the motor unit, and heat generated from the control unit including a printed circuit board (PCB) to be radiated from the control unit, respectively, and a water pump having the same.

In one general aspect, a motor integrated with a control unit includes: a motor unit including a stator, a motor housing having the stator disposed therein and fixed thereto and a rotor rotatably disposed in the stator in a radial direction; a control unit housing coupled to a bottom portion of the motor housing and having a central portion vertically open to form an empty space; a control board disposed in the control unit housing and fixed thereto, and having a first contact portion formed on a bottom surface thereof; and a control unit cover having a second contact portion formed on a top surface thereof and a heat sink formed on a bottom surface thereof and exposed to the outside, the second contact portion and the heat sink being connected to each other by a connecting portion, and coupled to a bottom portion of the control unit housing, thereby allowing the second contact portion to be in contact with the first contact portion of the control board.

In addition, the control unit housing may have a protrusion protruding from an inner circumferential surface thereof, and the control board may be supported and fixed to a bottom end of the protrusion.

In addition, the control unit housing may have a first connector pin protruding upward from a top surface of the protrusion and a second connector pin protruding downward from a bottom surface of the protrusion, the first connector pin and the second connector pin being connected to each other, the motor unit may have terminals connected to coils of the stator and drawn out of the motor housing, the terminals each being coupled and electrically connected to the first connector pin, and the control board may be coupled and electrically connected to the second connector pin.

In addition, a female thread may be formed on a lower inner circumferential surface of the control unit housing and a male thread may be formed on an outer circumferential surface of the control unit cover, and the control unit cover may thus be screwed and fixed to the control unit housing.

In addition, the first contact portion may be printed on the control board.

In addition, the second contact portion, the connecting portion and the heat sink may be formed integrally with one another, and the control unit cover may be integrally formed by insert-injecting the second contact portion, the connecting portion and the heat sink formed integrally with one another.

In addition, the motor housing of the motor unit may have a central bottom portion protruding downward, and a protruding bottom surface of the motor housing may thus be in contact with the control board.

In addition, the motor housing of the motor unit may have a fixing protrusion protruding from an outer circumferential surface thereof.

In addition, the motor housing of the motor unit may have no radiation fin protruding from the outer circumferential surface thereof.

In addition, the motor housing may have a heat radiation coating layer formed on the outer circumferential surface thereof.

In another general aspect, a water pump having a motor integrated with a control unit includes: a lower casing; an upper casing coupled to a top portion of the lower casing, having an impeller receiving space formed therein by being coupled to the lower casing, and having an inlet portion into which fluid flows and an outlet portion through which the fluid is discharged, in communication with the impeller receiving space; an impeller received in the impeller receiving space and including an upper plate, a lower plate and a plurality of blades, the upper and lower plates being disposed vertically apart from each other and the plurality of blades being disposed between the upper and lower plates and coupled thereto; and the motor integrated with a control unit as described above, coupled to a bottom portion of the lower casing and having the rotor coupled to the impeller.

In addition, the water pump may further include a rotor receiving portion having a shape of a concave container and formed integrally with the lower casing, wherein the rotor is disposed in the rotor receiving portion.

DETAILED DESCRIPTION OF EMBODIMENTS

Hereinafter, a motor integrated with a control unit and a water pump having the same according to embodiments of the present disclosure are described in detail with reference to the accompanying drawings.

Figure 1:
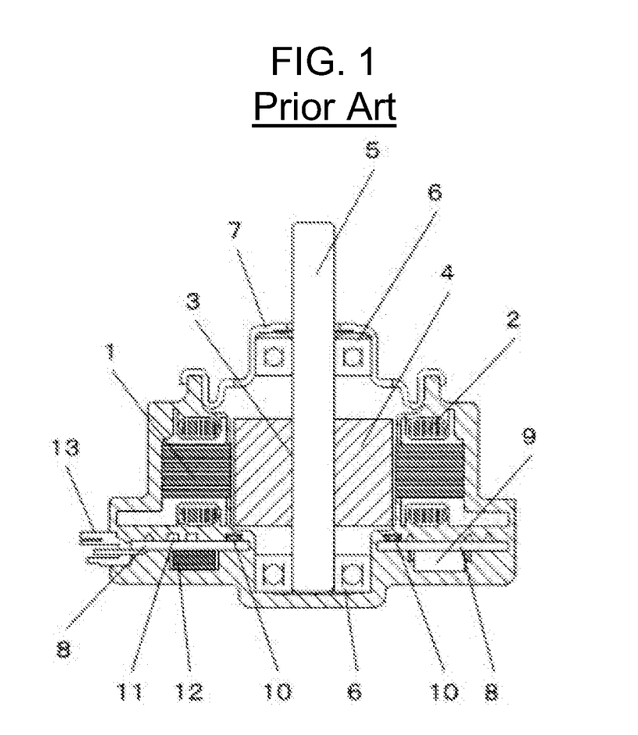
FIG. 1 is a front cross-sectional view of a conventional brushless direct current (BLDC) motor.
Figure 2:
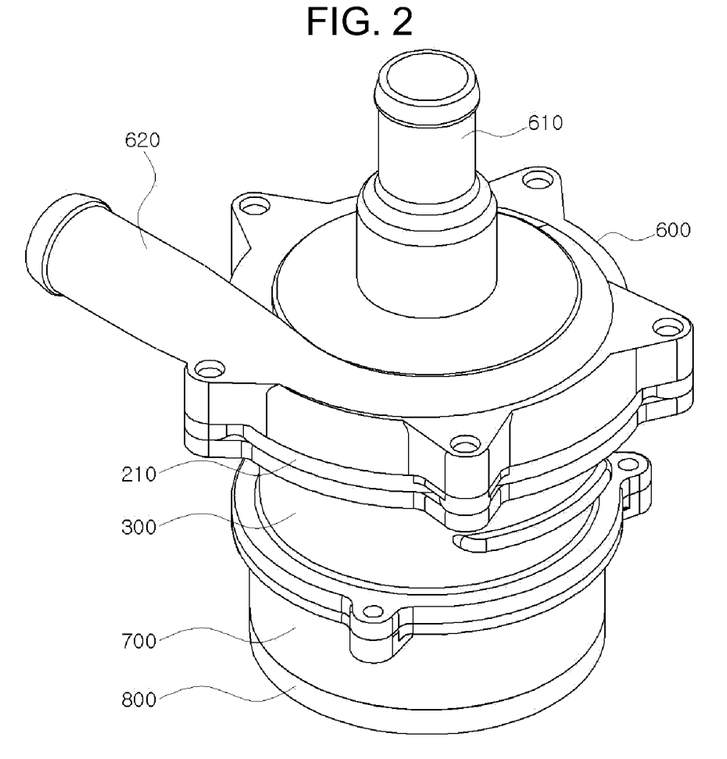
FIGS. 2 to 4 each are an assembled perspective view, a front view and an exploded perspective view of a water pump having a motor integrated with a control unit according to an embodiment of the present disclosure.
Figure 3:
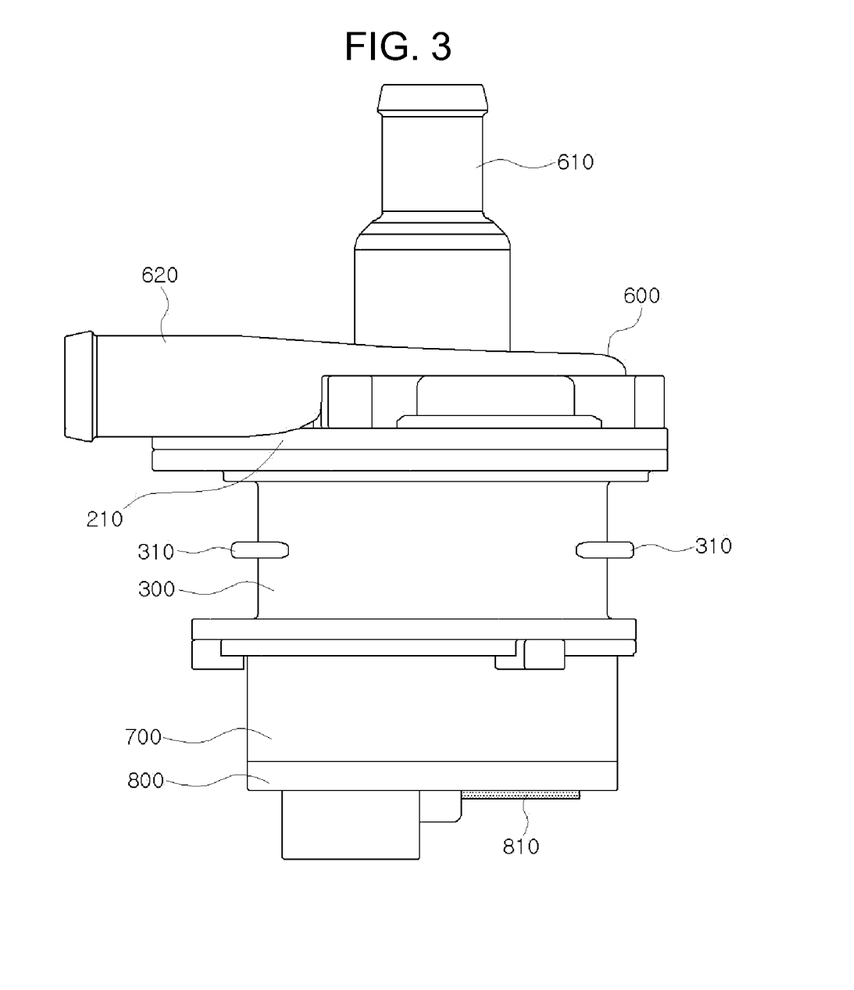
Figure 4:
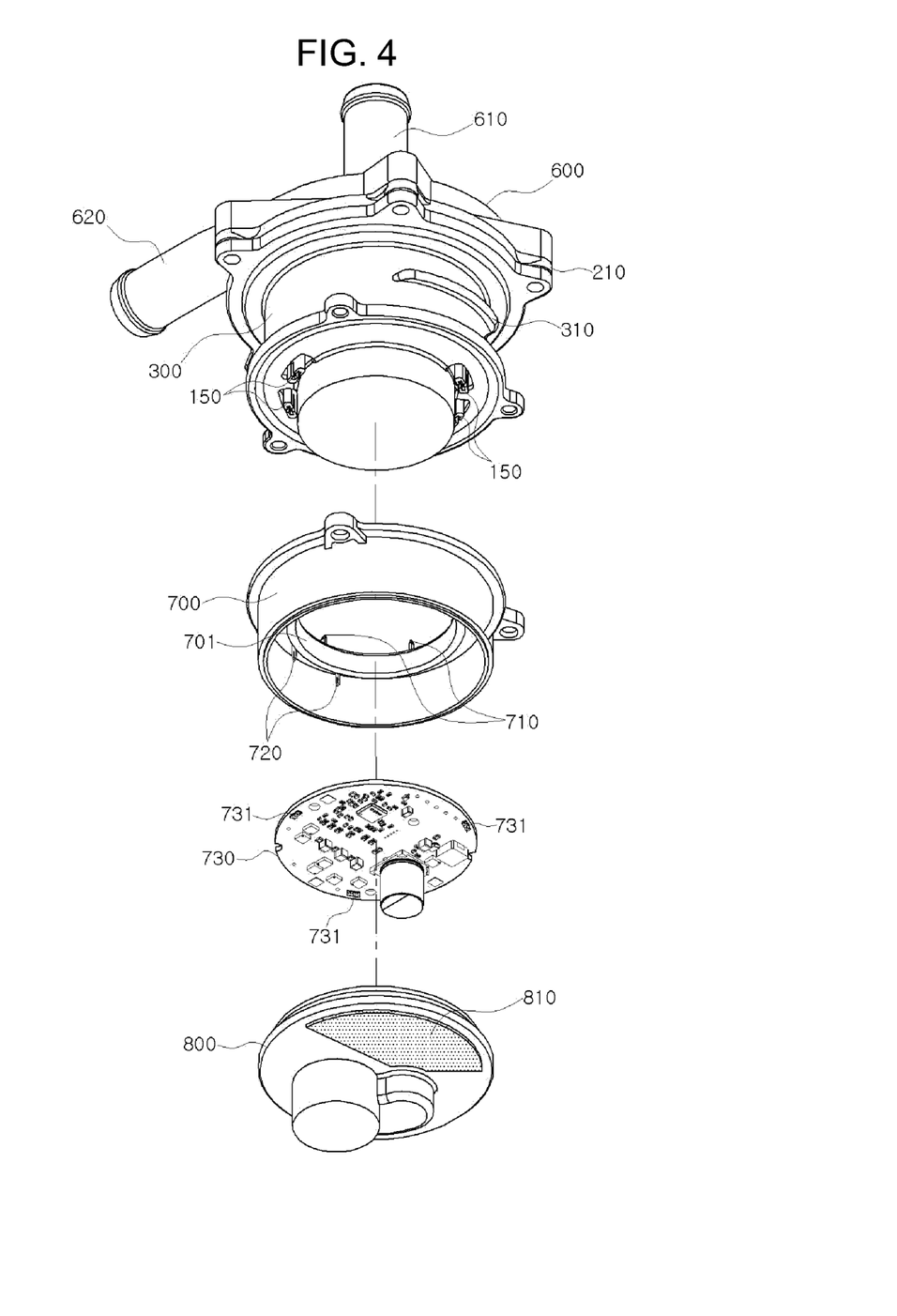
Figure 5:
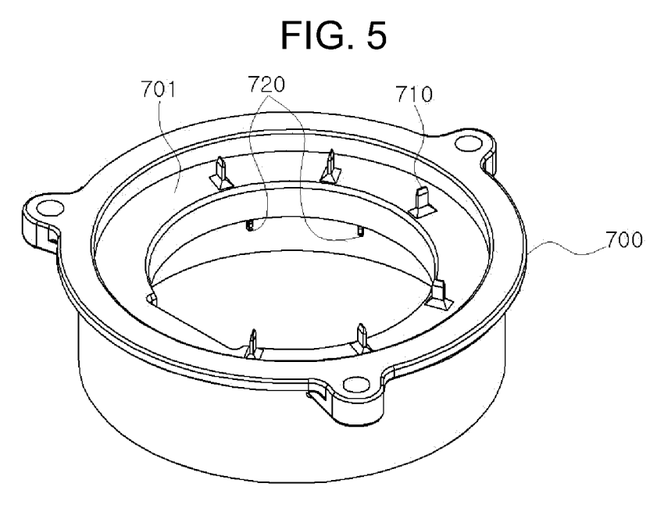
FIG. 5 is a perspective view of a control unit housing of the motor integrated with a control unit according to an embodiment of the present disclosure.

FIGS. 2 to 4 each are an assembled perspective view, a front view and an exploded perspective view of a water pump having a motor integrated with a control unit according to an embodiment of the present disclosure; FIG. 5 is a perspective view of a control unit housing of the motor integrated with a control unit according to an embodiment of the present disclosure; and FIGS. 6 and 7 each are an exploded cross-sectional view and an assembled cross-sectional view of the water pump having a motor integrated with a control unit according to an embodiment of the present disclosure.

As shown in the drawings, the motor integrated with a control unit according to an embodiment of the present disclosure may roughly include a motor unit and the control unit. In addition, the motor unit may include a stator 100, a motor housing 300 and a rotor 400, and the control unit may include a control unit housing 700, a control board 730 and a control unit cover 800.

First, the stator 100 of the motor unit may include a core 110, a plurality of teeth 120, an insulator 130, coils 140 and a plurality of terminals 150. For example, the core 110 may be formed in a cylindrical shape, and the plurality of teeth 120 may protrude radially inward from an inner circumferential surface of the core 110 formed in the cylindrical shape. In addition, the teeth 120 may be arranged to be spaced apart from each other along a circumferential direction, and thus be radially arranged toward the inside of the core 110. In addition, the teeth 120 arranged at radial inner ends may be spaced apart from each other in the radial direction, and the inside of the core 110 surrounded by the teeth 120 may be vertically open. The insulator 130 may be made of an electrically insulating material, and may be coupled to the core 110 and the teeth 120 by surrounding the core 110 and the teeth 120, respectively, thereby electrically insulating the core 110 and the teeth 120 from each other. For example, the insulator 130 may be formed on the top and bottom surfaces of the core 110, and may surround the top, bottom and side surfaces of the teeth 120. The coils 140 may be wound on the outside of the insulator 130 surrounding the teeth 120, and each winding of the coils 140 may be insulated by a sheath. The terminals 150 may be electrically connected to the coils 140, and each of the terminals 150 may be coupled and fixed to the insulator 130.

Figure 6:
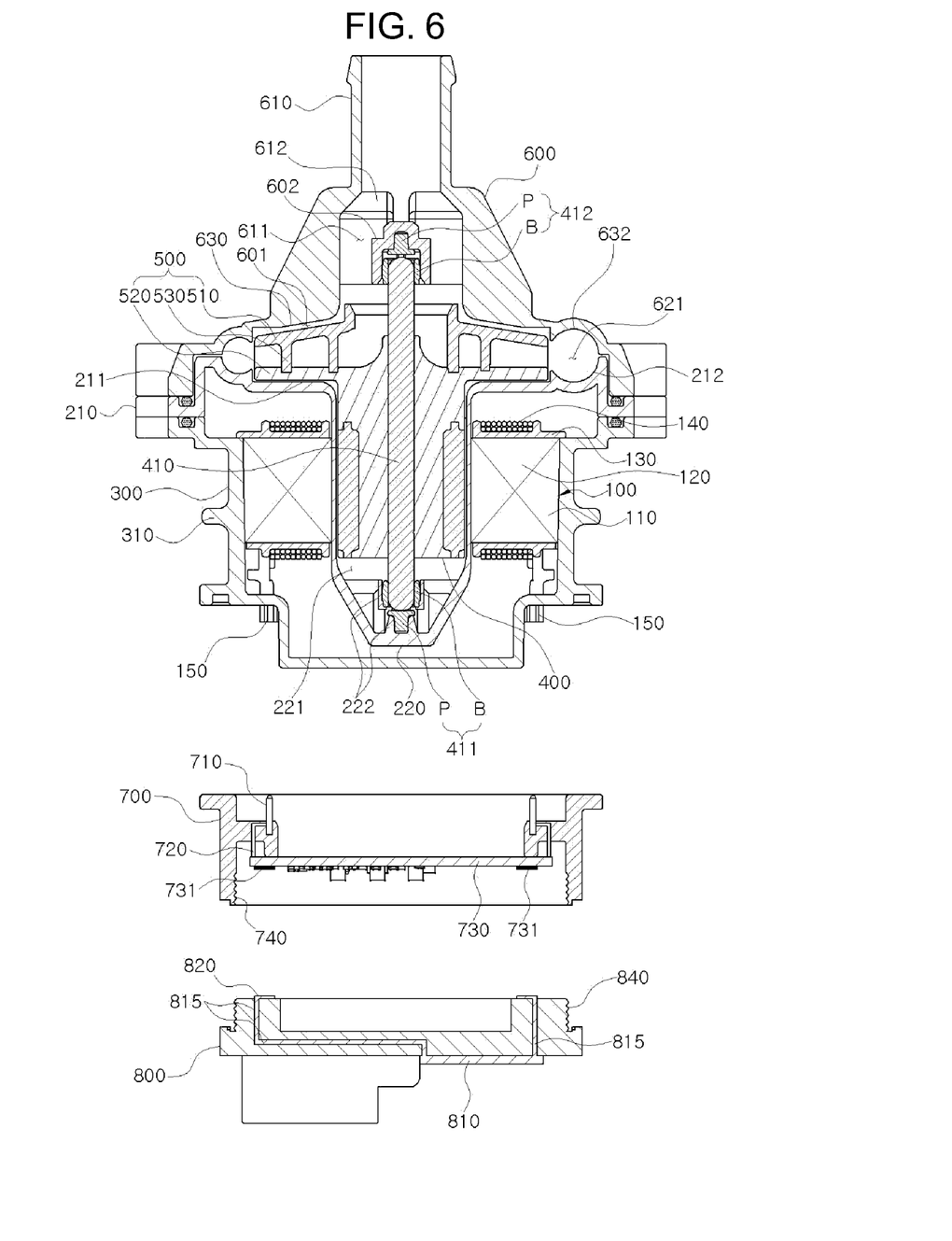
FIGS. 6 and 7 each are an exploded cross-sectional view and an assembled cross-sectional view of the water pump having a motor integrated with a control unit according to an embodiment of the present disclosure.

The motor housing 300 may be formed in a shape of a cylinder made of a metal material and thus be empty inside, and may have a closed bottom portion. In addition, the stator 100 may be disposed in the motor housing 300, and may be coupled and fixed to an inner circumferential surface of the motor housing 300. In addition, vertical through-holes may be formed at the bottom portion of the motor housing 300, and terminals 150 of the stator 100 may thus be drawn out of the motor housing 300 through the holes, and a gap between the terminal 150 and the hole may be sealed with a sealing member, etc. In addition, a central bottom portion of the motor housing 300 may protrude downward.

Figure 7:
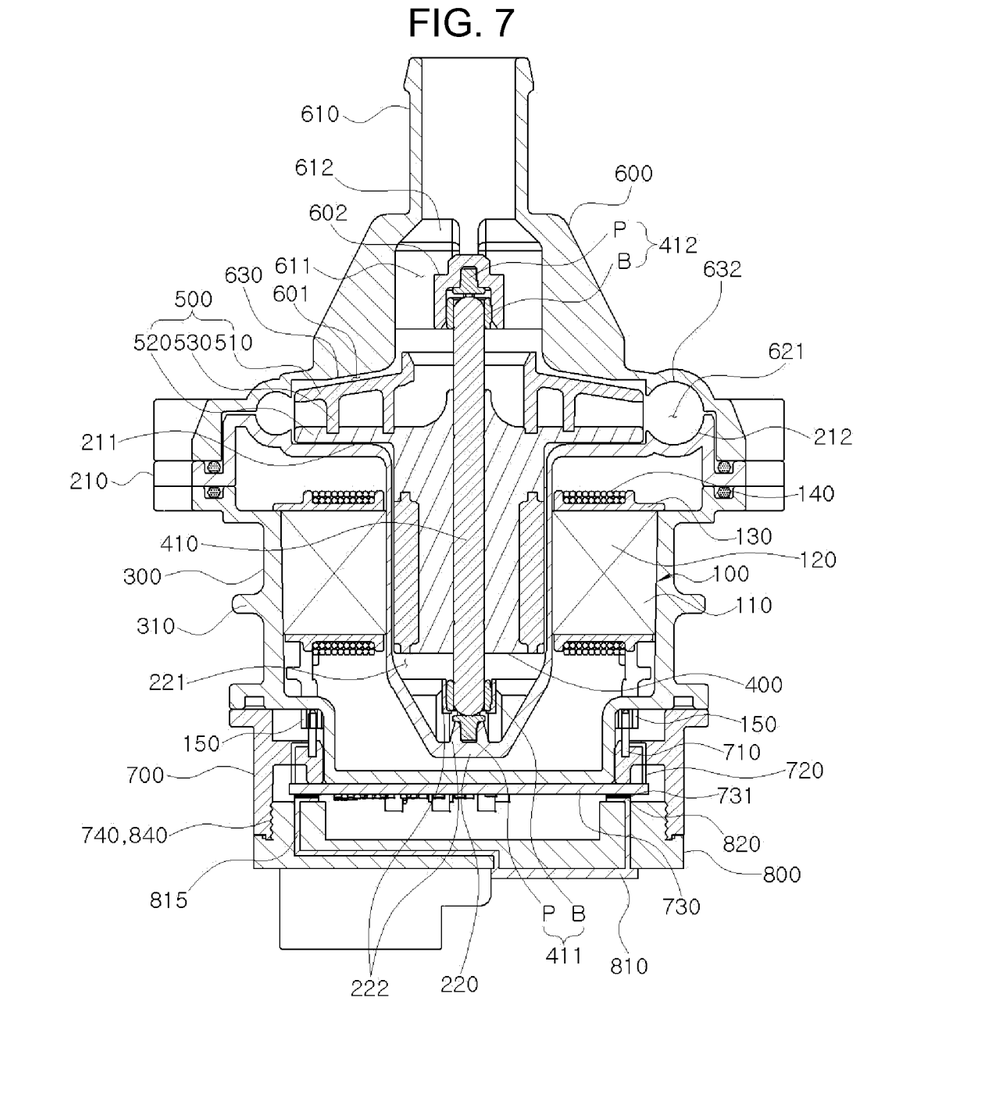

The rotor 400 may be disposed in the stator 100 in the radial direction in such a manner that an outer circumferential surface of the rotor 400 is spaced apart from an inner circumferential surface of the stator 100. In addition, the rotor 400 may be coupled to the motor housing 300 in such a manner that lower and upper end portions of a rotating shaft 410 are directly or indirectly rotatable with respect to the motor housing 300.

The control unit housing 700 of the control unit may be formed in a cylindrical shape and thus be empty inside, and may have a protrusion 701 protruding radially inward from a center of an inner circumferential surface thereof in the height direction. In addition, a top portion of the control unit housing 700 may be coupled and fixed to the bottom portion of the motor housing 300. In addition, the control unit housing 700 may have a first connector pin 710 protruding upward from a top surface of the protrusion 701 and a second connector pin 720 protruding downward from a bottom surface of the protrusion 701, the first connector pin 710 and the second connector pin 720 being connected to each other. Accordingly, the first connector pin 710 may be coupled and electrically connected to the terminal 150 of the stator 100 such that the control unit housing 700 is coupled to the motor housing 300. Here, the first connector pin 710 and second connector pin 720 may be formed of an integral metal and a body of the control unit housing 700 forming an overall shape of the control unit housing 700 may be made of resin. Therefore, the control unit housing 700 may be integrally formed by insert-injecting the first connector pin 710 and the second connector pin 720, which are formed integrally with each other, into the body.

The control board 730 may be a printed circuit board (PCB) on which electronic devices such as a switching device, a capacitor and the like are mounted. The control board 730 may be inserted into the control unit housing 700 and supported and fixed to a bottom end of the protrusion 701 of the control unit housing 700. In addition, the control board 730 may have a hole passing through its opposite surfaces at a position corresponding to that of the second connector pin 720, and the second connector pin 720 may thus be coupled to the control board 730 through the hole formed in the control board 730 as the control board 730 is coupled to the control unit housing 700. After being coupled to each other, the second connector pin 720 and the control board 730 may be electrically connected to each other by soldering or the like. Accordingly, the stator 100 and the control board 730 may be electrically connected to each other. In addition, the control board 730 may have a first contact portion 731 formed on a bottom surface thereof, and the first contact portion 731 may slightly protrude downward from the bottom surface of the control board 730. Here, the first contact portion 731 may be made of a material capable of transferring heat generated from the electronic devices mounted on the control board 730, and may be printed on the control board 730 by using a metallic paste. In addition, the first contact portion 731 may be formed using various materials and methods. In addition, a plurality of first contact portions 731 may each be disposed adjacent to and spaced apart from an edge of the control board 730 in a circumferential direction of the control board 730, and may be disposed in various other forms.

The control unit cover 800 may be coupled to a bottom portion of the control unit housing 700 in such a manner that the control unit cover 800 blocks a bottom end of the control unit housing 700. In addition, the control unit cover 800 may have a second contact portion 820 protruding at a position corresponding to that of the first contact portion 731 of the control board 730 on a top surface of the control unit cover 800 in the radial direction. Here, the second contact portion 820 may be formed in a shape of a continuous ring along a circumferential direction of the control unit cover 800, for example, and the second contact portion 820 may thus be in contact with the first contact portion 731 regardless of a rotated position of the control unit cover 800. A heat sink 810 may be formed on a bottom surface of the control unit cover 800, and the heat sink 810 may be exposed to the outside from the bottom surface of the control unit cover 800. In addition, the heat sink 810 and the second contact portion 820 may be connected to each other by a connecting portion 815, and the heat sink 810, the second contact portion 820 and the connection portion 815 may be made of a metal material capable of transferring heat. In addition, the heat sink 810, the second contact portion 820 and the connecting portion 815 may be made of an integral metal, and a body of the control unit cover 800 forming an overall shape of the control unit cover 800 may be made of resin. Therefore, the control unit cover 800 may be integrally formed by insert-injecting the heat sink 810, the second contact portion 820 and the connection portion 815, which are formed integrally with one another, into the body. Accordingly, a bottom surface of the first contact portion 731 may be kept in close contact with a top surface of the second contact portion 820 as the control unit cover 800 is coupled to the bottom portion of the control unit housing 700.

Accordingly, the motor integrated with a control unit of the present disclosure may be configured in such a manner that even though the motor unit and the control unit are formed integrally with each other, heat generated from the stator and rotor is radiated to the outside through the motor housing, and heat generated from the control board is radiated to the outside through the heat sink formed on the control unit cover. That is, the heat generated from the motor unit may be radiated from the motor unit and the heat generated from the control unit may be radiated from the control unit, respectively, and the motor unit and the control unit may thus be efficiently cooled.

In addition, a female thread 740 may be formed on a lower inner circumferential surface of the control unit housing 700 of the control unit and a male thread 840 may be formed on an outer circumferential surface of the control unit cover 800, and the control unit cover 800 may thus be screwed and fixed to the control unit housing 700. Therefore, the first contact portion 731 formed on the control board 730 and the second contact portion 820 formed on the control unit cover 800 may easily be in close contact with each other, thereby reducing contact resistance between the first contact portion 731 and the second contact portion 820 in heat transfer.

In addition, the motor housing 300 of the motor unit may have the central bottom portion protruding downward, and a protruding bottom surface of the motor housing 300 may thus be in contact with the control board 730. This configuration may allow the control unit to radiate the heat generated from the bottom portion of the motor unit, which is close to the control unit, by using the protruding bottom portion of the motor housing 300 when the heat generated from the motor unit is relatively greater than that generated from the control unit, thereby more efficiently cooling the motor integrated with a control unit.

In addition, the motor housing 300 of the motor unit may have a fixing protrusion 310 protruding radially outward from an outer circumferential surface thereof. That is, the motor integrated with a control unit of the present disclosure is formed integrally with a pump and the like, and may thus be used for a vehicle, etc. The fixing protrusion 310 may protrude from the outer circumferential surface of the motor housing 300 to fix the motor integrated with a control unit to a chassis, a fixing bracket or the like of a vehicle and to prevent its rotation thereon.

Here, the motor housing 300 may have no radiation fin protruding from the outer circumferential surface thereof other than the fixing protrusion 310, and may have a smooth shape. That is, the heat may be radiated from the motor unit and the control unit, respectively, and sufficient cooling may thus be achieved with no radiation fin protruding from the outer circumferential surface of the motor housing 300. In addition, the motor housing 300 may have no radiation fin protruding from the outer circumferential surface thereof and the fixing protrusion 310 may thus be variously shaped and simply disposed thereon, and the motor integrated with a control unit may thus be easily fixed to the vehicle. Here, the motor integrated with a control unit, which has the fixing protrusion 310 protruding from the outer circumferential surface of the motor housing 300, may be configured in such a manner that in a state in which the fixing protrusion 310 is inserted into a hole of the bracket fixed to the chassis or the like of the vehicle, the bracket may surround the motor housing 300 and may be coupled and fixed thereto using a fastening means or the like.

In addition, the motor housing 300 may have a heat radiation coating layer formed on the outer circumferential surface thereof, and the heat may thus be easily radiated to the outside through the motor housing 300 even with no radiation fin formed thereon. Here, for example, the heat radiation coating layer may be formed by a coating agent capable of forming a film having a thickness of several tens of micrometers using spray coating or the like on the outer surface of the motor housing 300. It is also possible to use various other coating agents and form the heat radiation coating layer in various ways.

A water pump having a motor integrated with a control unit according to an embodiment of the present disclosure may include the above-described motor integrated with a control unit and a pump unit coupled thereto.

The motor integrated with a control unit may be the same as described above, and the pump unit may include a lower casing 210, a rotor receiving portion 220, an impeller 500 and an upper casing 600. In addition, the pump unit may be coupled to a top portion of the motor integrated with a control unit.

First, a lower seating groove 211 may be formed to be concave downward from a top surface of the lower casing 210 to receive a portion of the impeller 500, and a lower flow passage groove 212 may be formed to be concave on the outside of the lower seating groove 211 in the radial direction to allow the fluid discharged from the impeller 500 to flow therethrough.

The rotor receiving portion 220 may be formed integrally with the lower casing 210 by injection, and the container-shaped rotor receiving portion 220 may be formed to be concave downward from a central portion of the lower casing 210. Therefore, a rotor receiving space 221 may be formed in the rotor receiving portion 220, and the rotor receiving portion 220 may protrude convexly downward from a bottom surface of the lower casing 210. In addition, the rotor receiving portion 220 may have a lower bearing mounting portion 222 formed at a lower bottom portion of the rotor receiving space 221, and a lower bearing 411 may be coupled to the lower bearing mounting portion 222. Here, the lower bearing 411 may include a bushing B capable of supporting the lower end portion of the rotating shaft 410 of the rotor 400 in the radial direction and a support pin P capable of supporting the lower end portion of the rotating shaft 410 in the axial direction. Therefore, the rotor 400 may be inserted and disposed in the rotor receiving space 221 in the rotor receiving portion 220, and the outer circumferential surface of the rotor 400 may be disposed to be spaced apart from an inner circumferential surface of the rotor receiving portion 220. In addition, the lower end portion of the rotating shaft 410 of the rotor 400 may be coupled to the lower bearing 411, and the rotor 400 may thus be smoothly rotated.

The upper casing 600 may be coupled to a top portion of the lower casing 210, and may have an impeller receiving space 601 capable of receiving the impeller 500 formed therein by being coupled to the lower casing 210. In addition, an upper seating groove 630 may be formed to be concave upward from a bottom surface of the upper casing 600 to receive a portion of the impeller 500 therein, and the lower seating groove 211 and the upper seating groove 630 may thus form the impeller receiving space 601. In addition, an upper flow passage groove 632 may be formed to be concave at a position corresponding to that of the lower flow passage groove 212 of the lower casing 210 on the bottom surface of the upper casing 600 to allow the fluid discharged from the impeller 500 to flow therethrough. In addition, a central portion of the upper casing 600 may be vertically open to allow the upper seating groove 630 and an inlet portion 610 to be in communication with each other, and an outlet portion 620 may be connected to the upper flow passage groove 632 and the lower flow passage groove 212. In addition, the upper casing 600 may have an upper bearing mounting portion 602 formed in the inlet portion 610, and an upper bearing 412 may be coupled to the upper bearing mounting portion 602. Here, the upper bearing mounting portion 602 may be disposed at a portion forming an inflow passage 611. However, the upper bearing mounting portion 602 may be fixed to support portions 612 each protruding from an inner circumferential surface of the inflow passage 611, and the fluid may thus smoothly pass between the support portions 612 and flow into the impeller 500. Here, the upper bearing 412 may include a bushing B capable of supporting the upper end portion of the rotating shaft 410 of the rotor 400 in the radial direction and a support pin P capable of supporting the upper end portion of the rotating shaft 410 in the axial direction. Therefore, the upper end portion of the rotating shaft 410 of the rotor 400 may be coupled to the upper bearing 412, and the rotor 400 may thus be smoothly rotated.

The impeller 500 may be rotated to serve to squeeze pump the fluid flowing into the inlet portion 610 of the upper casing 600 toward the outlet portion 620. The impeller 500 may include an upper plate 510, a lower plate 520 and a plurality of blades 530, the plurality of blades 530 being disposed spaced apart from each other along the circumferential direction, between the upper and lower plates 510 and 520 disposed vertically apart from each other. In addition, a vertical through-hole passing through opposite surfaces of the upper plate 510 may be formed in a central portion of the upper plate 510, and the inside of the impeller 500 may thus be in communication with the inlet portion 610 of the upper casing 600 through this through-hole. In addition, an outer circumferential surface of the impeller 500 may be disposed close to the lower flow passage groove 212 and the upper flow passage groove 632. Therefore, the fluid discharged from the impeller 500 may flow along a discharge passage 621 formed by the passage grooves, and then may be discharged through the outlet portion 620 of the upper casing 600. In addition, for example, the lower plate 520 of the impeller 500 may be formed integrally with a core portion of the rotor 400, the upper plate 510 and the blades 530 may be formed integrally with each other, and the blades 530 may be coupled to the lower plate 520. The impeller may also be formed in various other shapes.

Therefore, the fluid flowing into the inlet portion 610 of the upper casing 600 may flow into the impeller 500 through the inflow passage 611 and the through-hole in the upper central portion of the impeller 500. The fluid may then be boosted by a centrifugal force caused by the rotation of the impeller 500, flow to the discharge passage 621 and then flow along the discharge passage 621 to be discharged to the outside through the outlet portion 620.

According to the motor integrated with a control unit and the water pump having the same according to the present disclosure, the motor integrated with a control unit may be efficiently cooled by allowing heat to be radiated from a position close to a portion where the heat is generated.

The present disclosure is not to be construed as being limited to the above-mentioned embodiments. The present disclosure may be applied to various fields and may be variously modified by those skilled in the art without departing from the scope of the present disclosure claimed in the claims. Therefore, it is obvious to those skilled in the art that these alterations and modifications fall in the scope of the present disclosure.

What is claimed is:

1. A motor integrated with a control unit comprising:
a motor unit including a stator, a motor housing having the stator disposed therein and fixed thereto and a rotor rotatably disposed in the stator in a radial direction;
a control unit housing coupled to a bottom portion of the motor housing and having a central portion vertically open to form an empty space;
a control board disposed in the control unit housing and fixed thereto, and having a first contact portion formed on a bottom surface thereof; and
a control unit cover having a second contact portion formed on a top surface thereof and a heat sink formed on a bottom surface thereof and exposed to the outside, the second contact portion and the heat sink being connected to each other by a connecting portion, and coupled to a bottom portion of the control unit housing, thereby allowing the second contact portion to be in contact with the first contact portion of the control board;

wherein the control unit housing has a protrusion protruding from an inner circumferential surface thereof, and the control board is supported and fixed to a bottom end of the protrusion; and wherein the control unit housing has at least a first connector pin protruding upward from a top surface of the protrusion, and at least a second connector pin protruding downward from a bottom surface of the protrusion, the at least first connector pin and the at least second connector pin being connected to each other;

the at least first connector pin and the at least second connector pin are integrally connected with the control unit housing;

the motor unit has terminals connected to coils of the stator and drawn out of the motor housing, the terminals each being coupled and electrically connected to the at least first connector pin, and the control board is coupled and electrically connected to the at least second connector pin.

2. The motor integrated with a control unit of claim 1, wherein a female thread is formed on a lower inner circumferential surface of the control unit housing and a male thread is formed on an outer circumferential surface of the control unit cover, and the control unit cover is thus screwed and fixed to the control unit housing.

3. The motor integrated with a control unit according to claim 1, wherein the first contact portion is printed on the control board.

4. The motor integrated with a control unit according to claim 1, wherein the second contact portion, the connecting portion and the heat sink are formed integrally with one another, and the control unit cover is integrally formed by insert-injecting the second contact portion, the connecting portion and the heat sink formed integrally with one another.

5. The motor integrated with a control unit according to claim 1, wherein the motor housing of the motor unit has a central bottom portion protruding downward, and a protruding bottom surface of the motor housing is thus in contact with the control board.

6. The motor integrated with a control unit of claim 1, wherein the motor housing of the motor unit has a fixing protrusion protruding from an outer circumferential surface thereof.

7. The motor integrated with a control unit of claim 1, wherein the motor housing of the motor unit has no radiation fin protruding from the outer circumferential surface thereof.

8. The motor integrated with a control unit of claim 7, wherein the motor housing has a heat radiation coating layer formed on the outer circumferential surface thereof.

9. A water pump comprising:

a lower casing;

an upper casing coupled to a top portion of the lower casing, having an impeller receiving space formed therein by being coupled to the lower casing, and having an inlet portion into which fluid flows and an outlet portion through which the fluid is discharged, in communication with the impeller receiving space;

an impeller received in the impeller receiving space and including an upper plate, a lower plate and a plurality of blades, the upper and lower plates being disposed vertically apart from each other and the plurality of blades being disposed between the upper and lower plates and coupled thereto; and the motor integrated with a control unit of claim 1, coupled to a bottom portion of the lower casing and having the rotor coupled to the impeller.

10. The water pump of claim 9, further comprising a rotor receiving portion having a shape of a concave container and formed integrally with the lower casing, wherein the rotor is disposed in the rotor receiving portion.

\* \* \* \* \*